(12) United States Patent
Martin et al.

(10) Patent No.: US 10,142,922 B2
(45) Date of Patent: Nov. 27, 2018

(54) D2D PEER DISCOVERY AND DATA TRANSMISSION

(71) Applicant: SONY CORPORATION, Tokyo (JP)

(72) Inventors: Brian Alexander Martin, Basingstoke (GB); Anders Berggren, Lund (SE); Wei Na, Beijing (CN)

(73) Assignee: Sony Corporation, Tokyo (JP)

( * ) Notice: Subject to any disclaimer, the term of this patent is extended or adjusted under 35 U.S.C. 154(b) by 120 days.

(21) Appl. No.: 15/302,884

(22) PCT Filed: May 1, 2015

(86) PCT No.: PCT/EP2015/059616
§ 371 (c)(1),
(2) Date: Oct. 7, 2016

(87) PCT Pub. No.: WO2015/169706
PCT Pub. Date: Nov. 12, 2015

(65) Prior Publication Data
US 2017/0041863 A1    Feb. 9, 2017

(30) Foreign Application Priority Data

May 9, 2014   (EP) ..................... 14167801

(51) Int. Cl.
*H04W 48/16*        (2009.01)
*H04W 76/14*        (2018.01)
(Continued)

(52) U.S. Cl.
CPC ............. *H04W 48/16* (2013.01); *H04W 4/80* (2018.02); *H04W 8/005* (2013.01); *H04W 76/14* (2018.02); *H04W 84/12* (2013.01); *H04W 12/06* (2013.01)

(58) Field of Classification Search
CPC ... H04W 48/16; H04W 76/023; H04W 76/14; H04W 8/005; H04W 76/02; H04W 4/80; H04W 84/12
See application file for complete search history.

(56) References Cited

U.S. PATENT DOCUMENTS

2011/0282989 A1*  11/2011  Geirhofer ............. H04L 67/104
                                                        709/224
2012/0300662 A1   11/2012  Wang et al.
(Continued)

FOREIGN PATENT DOCUMENTS

WO        2015/113696 A1     8/2015

OTHER PUBLICATIONS

International Search Report dated Jun. 18, 2015 in PCT/EP2015/059616 filed May 1, 2015.
(Continued)

*Primary Examiner* — Mewale Ambaye
(74) *Attorney, Agent, or Firm* — Xsensus, LLP

(57) ABSTRACT

A communications device and method of communicating using a communications device via a wireless access interface. The method includes transmitting signals representing data in accordance with a device-to-device communication protocol via a shared communication channel of the wireless access interface. The transmitting the signals includes: selecting an identifier which identifies a party and identifies a discovery communication type; transmitting a scheduling assignment message in an scheduling assignment portion of the shared communications channel, wherein the scheduling assignment message includes the selected identifier for discovery by one or more other communications devices; and transmitting the signals representing the data in a data portion of the shared communications channel in accordance
(Continued)

with the scheduling assignment message. The method can facilitate use of discovery in device-to-device environments.

15 Claims, 8 Drawing Sheets

(51) Int. Cl.
*H04W 84/12* (2009.01)
*H04W 4/80* (2018.01)
*H04W 8/00* (2009.01)
*H04W 12/06* (2009.01)

(56) References Cited

U.S. PATENT DOCUMENTS

2013/0170387 A1  7/2013  Wang et al.
2014/0057670 A1* 2/2014  Lim ..................... H04W 8/005
                                                    455/509

OTHER PUBLICATIONS

"CSMA/CA based resource selection," Samsung, published at 3GPP TSG-RAN WG2 #84, R2-133840, Nov. 2013, (4 pages).
"Network control for Public Safety D2D Communications," Orange, Huawei, HiSilicon, Telecom Italia, published at 3GPP TSG-RAN WG2 #84, R2-133990, Nov. 2013, (5 pages).
"The Synchronizing Central Node for Out of Coverage D2D Communication," General Dynamics Broadband UK, published at 3GPP TSG-RAN WG2 #84, R2-134246, Nov. 2013, (3 pages).
"Medium Access for D2D communication," LG Electronics Inc., published at 3GPP TSG-RAN WG2 #84, R2-134426, Nov. 2013, (9 pages).
"D2D Scheduling Procedure," Ericsson, published at 3GPP TSG-RAN WG2 #84, R2-134238, Nov. 2013, (7 pages).
"Possible mechanisms for resource selection in connectionless D2D voice communication," General Dynamics Broadband UK, published at 3GPP TSG-RAN WG2 #84, R2-134248, Nov. 2013, (9 pages).
"Simulation results for D2D voice services using connectionless approach," General Dynamics Broadband UK, published at 3GPP TSG-RAN WG2 #84, R2-134431, Nov. 2013, (6 pages).
Xiaogang R. et al, "D2D Resource Allocation under the Control of BS," University of Electronic Science and Technology of China, https://11mentor.ieee.org/802_16/don/13/16-12-0123-02-000n-d2d-resource-allocation-under-the-control-of-bs.docx, (7 pages).
Holma, Harri et al., LTE for UMTS: OFDMA and SC-FDMA Based Radio Access, Wiley 2009, ISBN 978-0-470-99401-6, (4 pages).
"L2 Addresses for Public Safety D2D discovery and communication user data," Alcatel-Lucent, Alcatel-Lucent Shanghai Bell, published at 3GPP TSG-RAN WG2 Meeting #85, R2-140723, XP050792013, Feb. 2014, (5 pages).
"D2D discovery," Nokia, Nokia Siemens Networks, published at 3GPP TSG-RAN WG1 Meeting #73, R2-132317, XP050698082, May 2013, (5 pages).
"Aspects of D2D Discovery," Qualcomm Incorporated, published at 3GPP TSG-RAN WG2 #83, R2-132446, XP050718178, Aug. 2013, (4 pages).
"Signaling of D2D discovery related identities," LG Electronics Inc., published at 3GPP TSG-RAN WG2 #84, R2-134368, XP050737079, Nov. 2013 , (2 pages).
"Study on LTE Device to Device Proximity Services," Qualcomm Incorporated, published at 3GPP TSG-RAN Meeting #58, RP-122009, 2012, (6 pages).
"Work item proposal on LTE Device to Device Proximity Services," Qualcomm Incorporated, published at 3GPP TSG RAN Meeting #63, RP-140518, Mar. 2014, (7 pages).
"$3^{rd}$ Generation Partnership Project: Technical Specification Group Service and System Aspects; Study on architecture enhancements to support Proximity Services (ProSe) (Realese 12)," published at 3GPP TR 23.703, V0.1.0 (Feb. 2013), (7 pages).
"WF on Content of Scheduling Assignment," Qualcomm Incorporated, III, CATT, General Dynamics, published at 3GPP TSG RAN WG1 #76BIS, R1-141802, Mar. 31-Apr. 4, 2014, (2 pages).

* cited by examiner

D2D PEER DISCOVERY AND DATA TRANSMISSION

CROSS-REFERENCE TO RELATED APPLICATIONS

The present application is based on PCT filing PCT/EP2015/059616 filed May 1, 2015 and claims priority to European Patent Application 14167801.1, filed in the European Patent Office on May 9, 2014, the entire contents of each of which being incorporated herein by reference.

TECHNICAL FIELD OF THE DISCLOSURE

The present disclosure relates to communications devices and methods for communicating data using communications devices, and in particular to communications devices which are configured to perform device-to-device communications.

BACKGROUND OF THE DISCLOSURE

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications will be introduced.

D2D communications allow communications devices that are in close proximity to directly communicate with each other, both when within and when outside of a coverage area or when the network fails. This D2D communications ability can allow user data to be more efficiently communicated between communications devices by obviating the need for user data to be relayed by a network entity such as a base station, and also allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution to public safety communications compared to dedicated systems such as TETRA, which are currently used throughout the world. However the requirements and expectations for D2D communications can differ from those for conventional LTE communications. The technical constraints of conventional LTE communications can thus create challenges for D2D communications, for example for sending discovery messages using D2D communications. In particular, D2D communications are well suited for direct one-to-one communications where a party communicates data with another clearly-identified party. Such a design can render discovery messaging more difficult.

SUMMARY OF THE DISCLOSURE

According to a first example embodiment of the present technique there is provided a method of communicating using a communications device via a wireless access interface. The method comprises transmitting signals representing data in accordance with a device-to-device communication protocol via a shared communication channel of the wireless access interface. The transmitting the signals comprises selecting an identifier which identifies a party and identifies a discovery communication type; transmitting a scheduling assignment message in an scheduling assignment portion of the shared communications channel, wherein the scheduling assignment message comprises the selected identifier for discovery by one or more other communications devices; and transmitting the signals representing the data in a data portion of the shared communications channel in accordance with the scheduling assignment message.

Embodiments of the present technique can provide an arrangement for facilitating the transmission of discovery messages thereby making D2D communications more suitable for discovery of for example devices, groups or services.

The wireless access interface may be a mobile network interface such as a 3GPP LTE device-to-device interface. The scheduling assignment message may include an indication of the resources of the data portion of the shared communications channel used for transmitting the signals.

The party may be the communications device. For example the communications device may be sending a discovery message to announce its presence. The party may be a further communications device or a group of communications devices. For example the communications device may be sending a discovery message to discover whether the further communications device or group of communications devices is present. In another example, the communications device may be a member of the group and send a discovery message on behalf of the group to announce the presence of the group. The party may also be a service. For example, the communications device may be attempting to discover the presence of the service or may be announcing presence of the service. In one example, the communications device may for example have full network connectivity (e.g. may be connected to an e-NodeB) and may announce its ability to bridge emergency calls to the network for non-connected devices.

The identifier may be at least partly based on an identifier of the communications device, a further communications device or a group of communications devices. For example, the identifier may advantageously identify discovery-type communications for the communications device, further communications device or group of communications devices so as to facilitate filtering of generic and discovery-type communication from or for devices or services. The identifier may also be a generic discovery identifier. For example, the identifier may identify the party as being the discovery service and further discovery information may be provided in the data transmitted in the data portion of the shared communications channel.

In an example, the transmitted scheduling assignment message and represented data may be for a discovery message for announcing the presence of the party. This type of discovery communications is for other devices, groups or services to be aware of the presence of the party. In another example, the transmitted scheduling assignment message and represented data may be for a discovery message for discovering the party. This type of discovery communications is for the communications device to be aware of the presence of other communications devices, groups or services.

The discovery communications type identified may for example be a non-specified type, where it may not be necessary to indicate the specific type of discovery communications or where it may be apparent from the scheduling assignment message and/or transmitted data which type of discovery communications the signals relate to. The discovery communications type identified may also be one of restricted discovery (e.g. where security steps may be required to complete discovery process and/or where it may be restricted to a specific set of parties) and open discovery (e.g. where anyone can participate in the discovery communications).

In the event that the discovery communications are restricted discovery communications, the scheduling assignment message may comprise security information for performing restricted discovery communications. In other examples, the security information may be comprised in the represented data or may be comprised in both the represented data and in the scheduling assignment.

At least part of the identifier may also be used for scrambling at least one of a CRC of the scheduling assignment and the represented data sent in the data portion in accordance with the scheduling assignment. In the event that scrambling of the CRC of the scheduling assignment and/or of the represented data sent in the data portion in accordance with the scheduling assignment is available for the D2D communications, using at least part of the identifier with this option may increase the level of control of the party or parties able to decode the represented data.

The method scheduling assignment may be sent as a Layer 1 control signal or it may be sent as a Layer 2 control signal (e.g. as a MAC message).

According to some examples, embodiments can provide a communications device comprising a transmitter; a receiver; and a controller. The transmitter and receiver provide a wireless access interface. The controller is arranged to transmit, via the transmitter, signals representing data in accordance with a device-to-device communication protocol via a shared communication channel of the wireless access interface. The controller being arranged to transmit the signals comprises the controller being arranged to select an identifier which identifies a party and identifies a discovery communication type; transmit a scheduling assignment message in an scheduling assignment portion of the shared communications channel, wherein the scheduling assignment message comprises the selected identifier for discovery by one or more other communications devices; and transmit the signals representing the data in a data portion of the shared communications channel in accordance with the scheduling assignment message.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Figure 1:
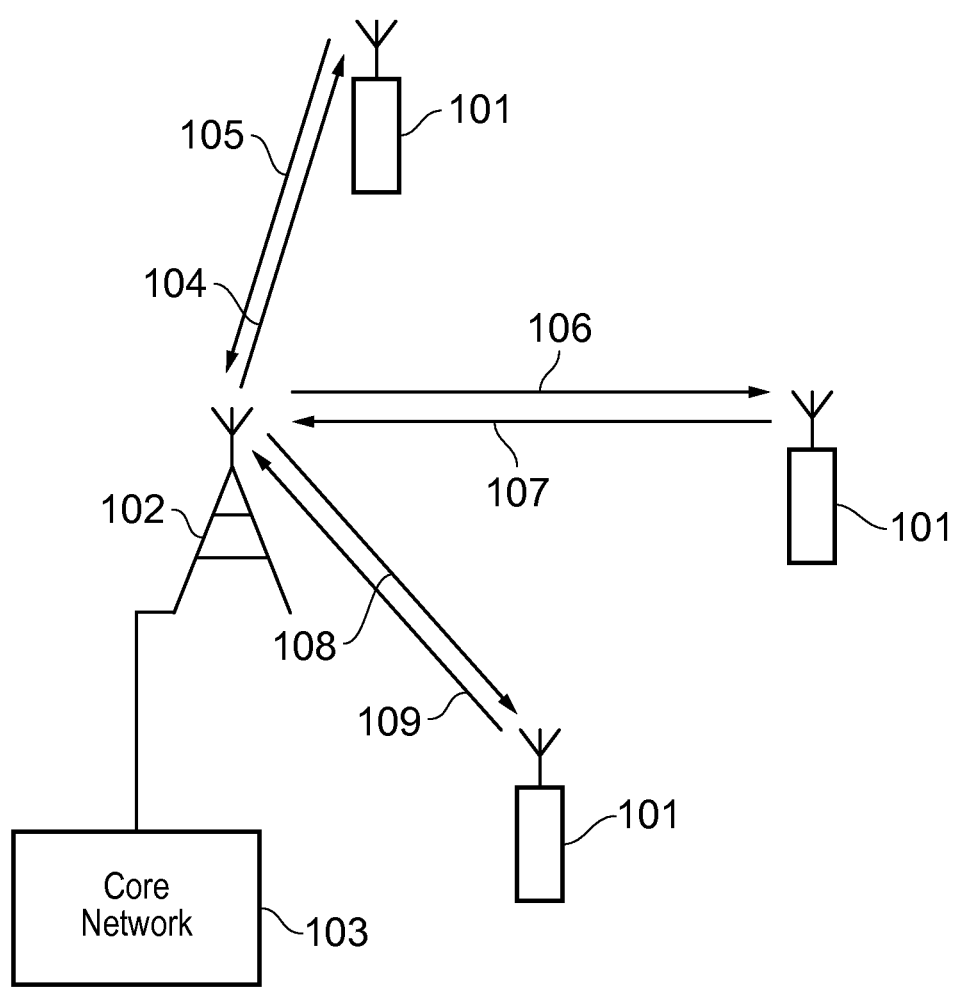
FIG. 1 provides a schematic diagram of a mobile communications system.

FIG. 1 provides a schematic diagram of a conventional mobile telecommunications system 100, where the system includes mobile communications devices 101, infrastructure equipment 102 and a core network 103. The infrastructure equipment may also be referred to as a base station, network element, enhanced Node B (eNodeB or eNB) or a coordinating entity for example, and provides a wireless access interface to the one or more communications devices within a coverage area or cell. The one or more mobile communications devices may communicate data via the transmission and reception of signals representing data using the wireless access interface. The network entity 102 is communicatively linked to the core network 103 where the core network may be connected to one or more other communications systems or networks which have a similar structure to that formed from communications devices 101 and infrastructure equipment 102. The core network may also provide functionality including authentication, mobility management, charging and so on for the communications devices served by the network entity. The mobile communications devices of FIG. 1 may also be referred to as communications terminals, user equipment (UE), terminal devices and so forth, and are configured to communicate with at least one or more other communications devices served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications devices and 105, 107 and 109 represent the uplink communications from the communications devices to the network entity. The communications system 100 may operate in accordance with any known protocol, for instance in some examples the system 100 may operate in accordance with the 3GPP Long Term Evolution (LTE) standard where the network entity and communications devices are commonly referred to as eNodeB and UEs, respectively.

Figure 2:
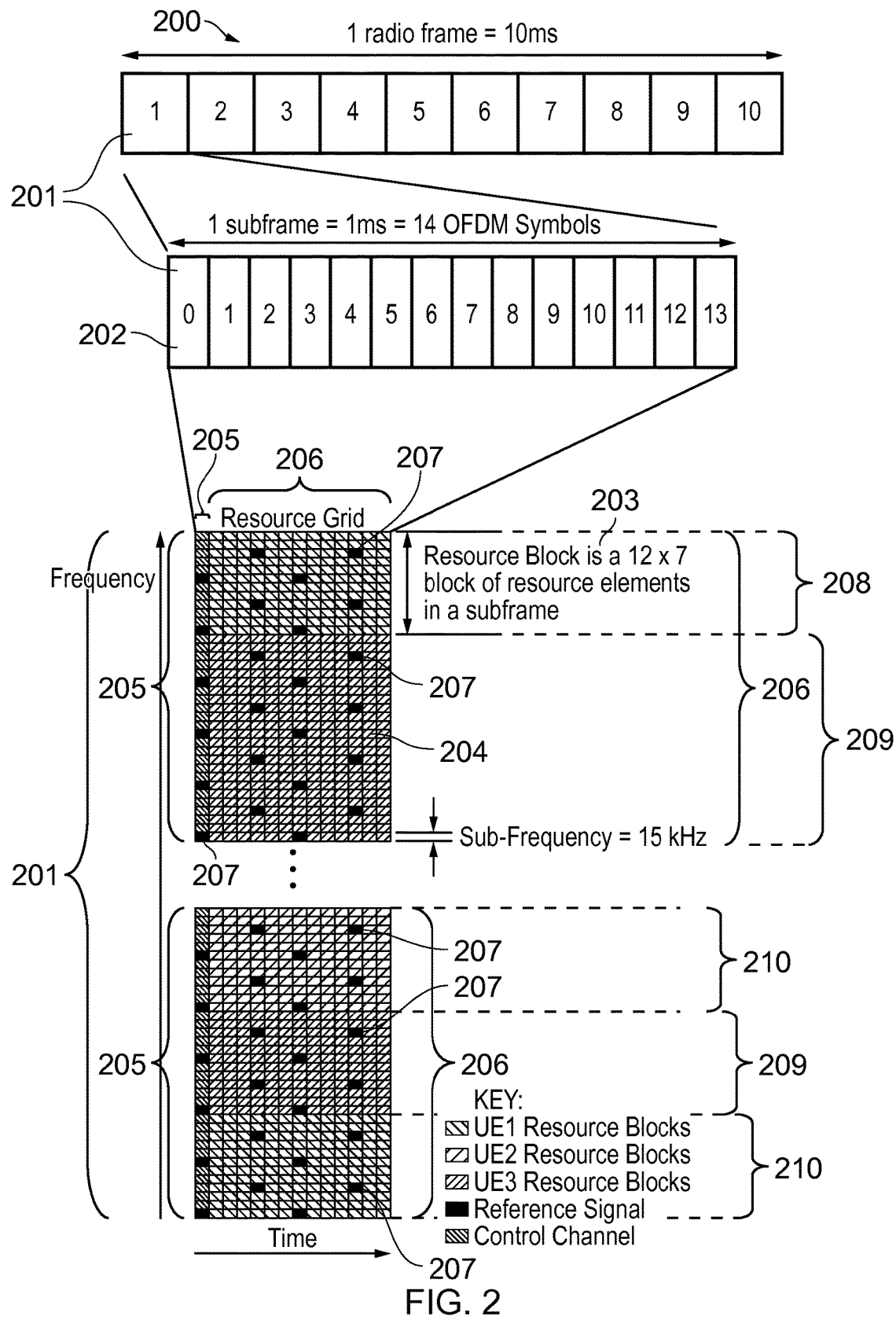
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 205 may contain a number of physical channels for the transmission of control data, such as a physical downlink control channel (PDCCH), a physical control format indicator channel (PCFICH) and a physical HARQ indicator channel (PHICH). The data region 206 may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [11].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
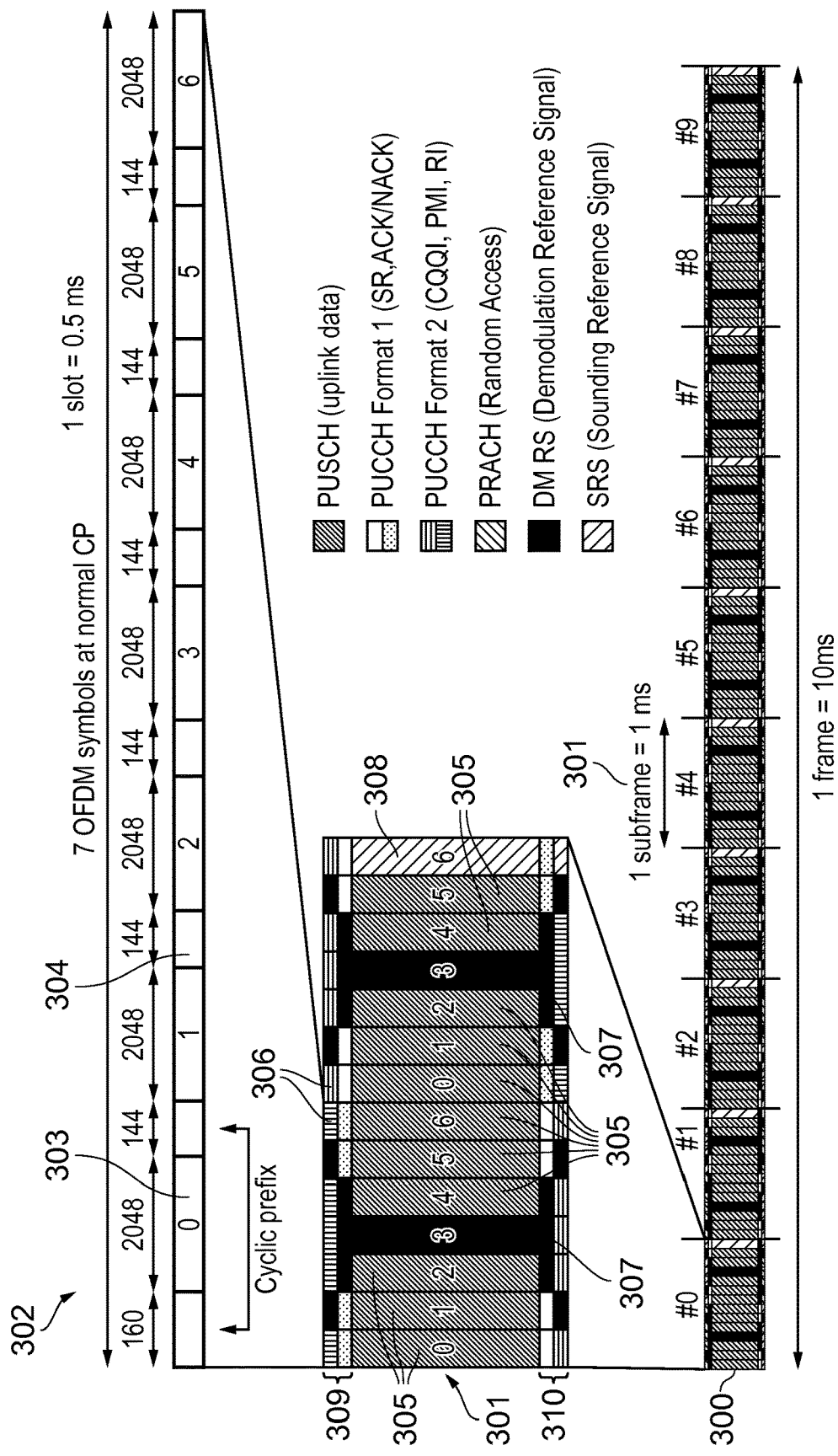
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNode B. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

Device-to-Device Communications

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
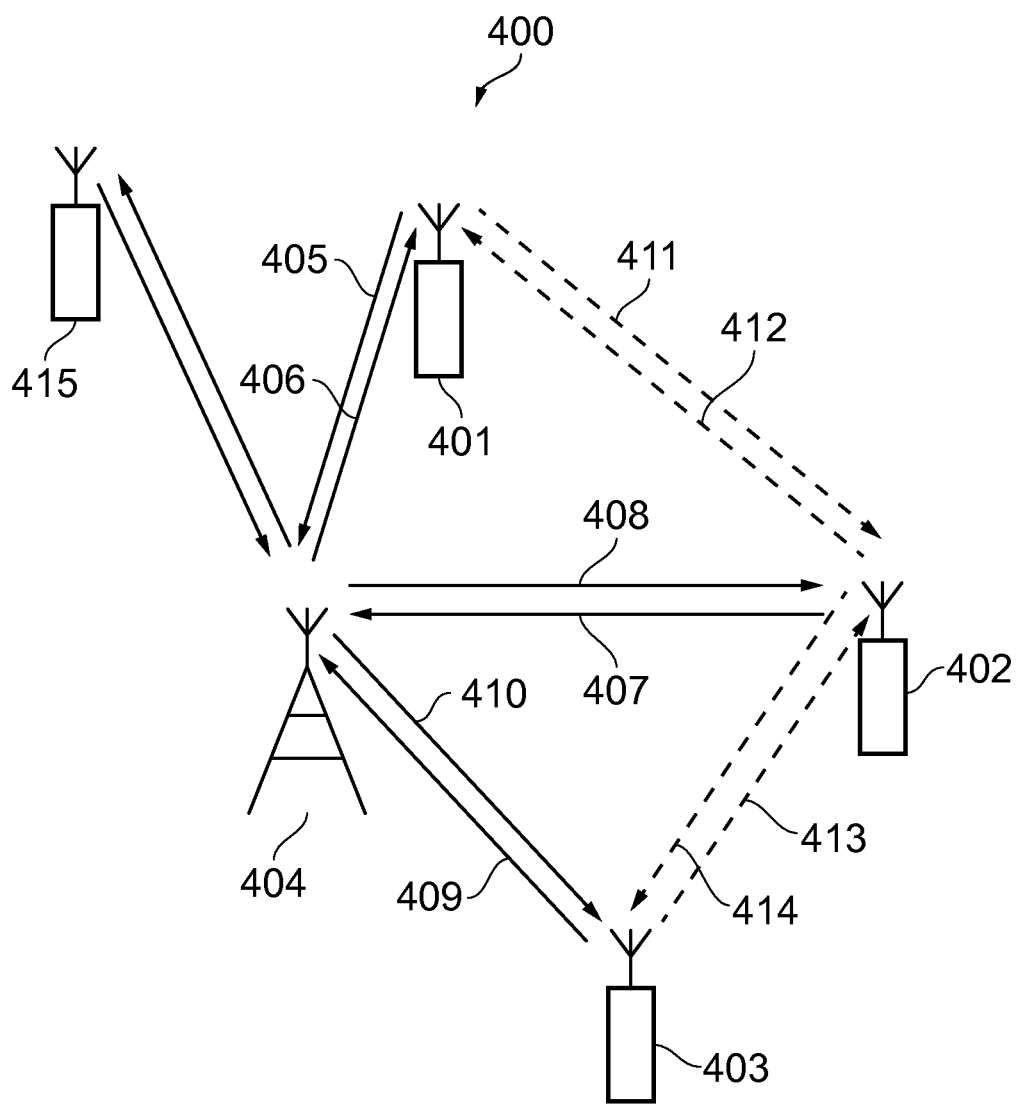
FIG. 4 provides a schematic diagram of a mobile communications system in which communications devices can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401 402 403 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation as that illustrated in FIG. 4 may exist in an LTE network where UE 415 is a device not compliant with the specifications for D2D operation. It has previously been proposed to provide some arrangement for device to device communication within standards which define communications systems according to specifications administered by the 3GPP referred to as Long Term Evolution (LTE). A number of possible approaches to the implementation of LTE D2D communications exist. For example, the wireless access interface provided for communications between UEs and eNodeB may be used for D2D communications, where an eNodeB allocates the required resources and control signalling is communicated via the eNodeB but user data is transmitted directly between UEs.

The wireless access interface utilised for D2D communications may be provided in accordance with any of a number of techniques, such as carrier sense multiple access (CSMA), OFDM or a combination thereof for example as well as an OFDM/SC-FDMA 3GPP LTE based wireless access interface. For example it has been proposed in document R2-133840 [1] to use a Carrier Sensed Multiple Access, CSMA, co-ordinations of transmission by UEs, which is un-coordinated/contention based scheduling by each UE. Each UE first listens then transmits on an unused resource.

In another example, UEs may communicate with each other by negotiating access to a wireless access interface directly, thus overcoming the need for a coordinating eNodeB. Examples of previously proposed arrangements include those in which one of the UEs of the group acts as a controlling entity to co-ordinate the transmissions of the other members of the group. Examples of such proposals are provided in the following documents:

[2] R2-133990, Network control for Public Safety D2D Communications; Orange, Huawei, HiSilicon, Telecom Italia

[3] R2-134246, The Synchronizing Central Node for Out of Coverage D2D Communication; General Dynamics Broadband UK

[4] R2-134426, Medium Access for D2D communication; LG Electronics Inc

In another arrangement one of the UEs of the group first sends a scheduling assignment, and then transmits data without a central scheduling UE or controlling entity controlling the transmissions. The following documents provide examples of this de-centralised arrangement:

[5] R2-134238, D2D Scheduling Procedure; Ericsson;

[6] R2-134248, Possible mechanisms for resource selection in connectionless D2D voice communication; General Dynamics Broadband UK;

[7] R2-134431, Simulation results for D2D voice services using connectionless approach; General Dynamics Broadband UK In particular, the last two contributions listed above, R2-134248 [6], R2-134431 [7], discuss the use of a scheduling channel, used by UEs to indicate their intention to schedule data along with the resources that will be used. The other document, R2-134238 [5], does not use a scheduling channel as such, but deploys at least some predefined resources to send the scheduling assignments.

Other example arrangements discussed in [8] and [9] require a base station to provide feedback to the communications devices to control their transmissions. Document [10] discusses an arrangement in which a dedicated resource exchanging channel is provided between cellular user equipment and device-to-device user equipment for interference control and resource coordination.

Figure 5A:
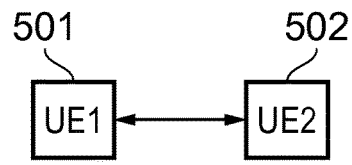
FIGS. 5a to 5d provides schematics diagrams of example device-to-device communications scenarios.
Figure 5B:
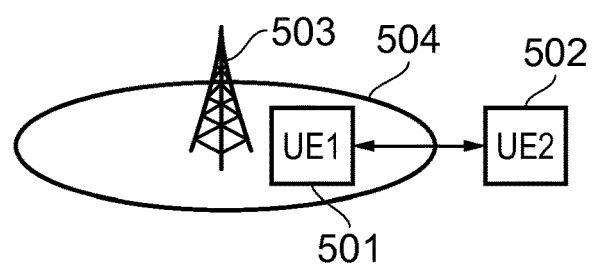
Figure 5C:
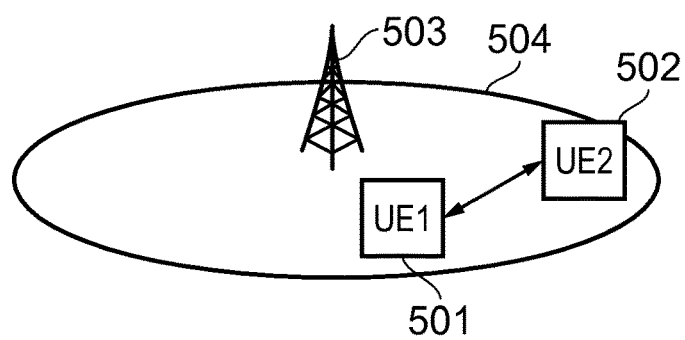
Figure 5D:
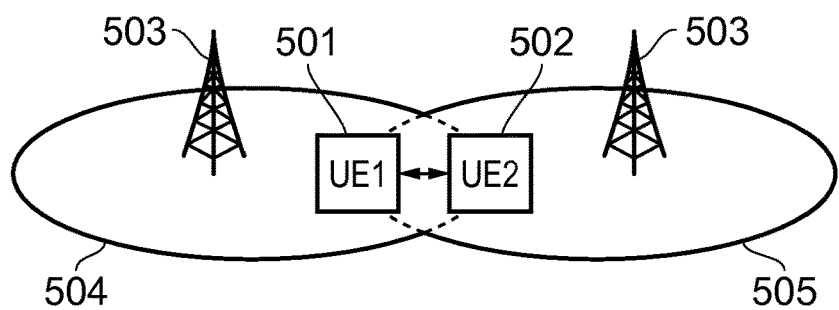

As a result of the possible approaches to the organisation of a D2D devices and networks, a number of scenarios may arise. A selection of example scenarios is provided by FIGS. 5a to 5d. In FIG. 5a UEs 501 and 502 are outside of a coverage area of an eNodeB. Such a scenario may occur in public safety communications for example, where either the UEs are outside of a coverage area or where the relevant mobile communications network is not currently functioning correctly. In FIG. 5b UE 501 is within a coverage area 504 of an eNodeB 503 and is performing D2D communications with UE 502 which is outside the coverage area 503. In FIG. 5c both UE 501 and 502 are within the coverage area of the eNodeB 503. In FIG. 5d a fourth more complex D2D scenario is illustrated, where UE 501 and UE 502 are each within the coverage areas 504 505 of different eNodeBs 503 and 504 respectively. FIGS. 5a to 5d illustrates just four of a large number of possible D2D usage scenarios, where further scenarios may be formed from combinations of those illustrated in FIGS. 5a to 5d. For example, two UEs communicating as shown in FIG. 5a may move into the usage scenario of FIG. 5d such that there are two groups of UEs performing D2D communications in the coverage areas of two eNodeBs.

Co-pending EP patent application EP14153512.0 discusses an arrangement in which communications devices which are configured to perform D2D communications, the contents of which are incorporated herein by reference. The communications devices are arranged to reserve shared communications resources, such as those of the PUSCH of an LTE Up-link, by transmitting a scheduling assignment messages in a predetermined section of resources, referred to as a scheduling assignment region, allocated for performing contentious access. As discusses in EP14153530.2, the contents of which are incorporated herein by reference, a contention resolution procedure is adopted by the communications devices so that if one or more communications devices transmit scheduling assignment messages contemporaneously in the same section of the scheduling assignment region then the communications devices can detect the contentious access and re-try at a different time.

Discovery

When establishing a D2D communications link, such as one-way D2D communications link 414 from the UE 402 to the UE 403, it may be beneficial for the initiating UE to have knowledge of the other D2D capable UEs within range. According to a first example, a serving eNodeB or coordinating entity may compile a list of UEs within its coverage area capable of performing D2D communications and distribute the list to the appropriate UEs within its coverage area. According to second example, the eNodeB may also compile a list of UEs which have recently left its coverage and which may thus still be operating in the vicinity of the eNodeB range. A UE may also make use of this list once it no longer is within the eNodeB coverage to try to establish a communication link with another UE which may still be within the eNodeB range or which may also be outside the eNodeB range.

According to a third example, a UE may have a list of other UEs or groups of UEs it may wish to connect to for D2D communications and the UE may attempt to establish a communication link with each relevant UE or group of UE on the list. For example, in the event that an emergency services user wishes to use its UE while being out of coverage of an eNodeB, the UE may try to connect to an emergency services group or to specific UEs (e.g. the UEs used in the user's emergency services team) which are taken from a list already stored in the UE but may not attempt to connect to other UEs or groups of UEs (e.g. personal UEs or groups of UEs).

However, the above arrangements lack flexibility for a UE to discover which UEs, groups, and services are available within its range, in particular UEs it has not communicated with before or UEs which are out of range of eNodeBs.

Conventionally, D2D messages are well-suited for one-to-many (1:M) communications. For example, when using discovery messages to announce one's presence or to discover one's presence, a UE may not be aware of a specific destination UE or UEs to use in the discovery messages, especially when the UE may be attempting to discover the destination UE or party. Additionally, it would be advantageous for a UE receiving D2D signals to be able to discriminate between conventional D2D data and between discovery messages so that it can determine which signals to decode. Otherwise, the UE may have to decode more signals, which can be resource-consuming and may thus require more computing and battery capabilities.

Sending a direct discovery message for D2D direct discovery has been discussed in 3GPP Rel-12, and relies on being within the coverage of an eNodeB. On the other hand, D2D 1:M communications is designed to work out of coverage of an eNodeB.

Thus, the above-methods for establishing a D2D communication link with another UE or group of UEs can be time- and resource-consuming and can lack flexibility. It may thus be advantageous to provide methods and systems which facilitate discovery-type communications in a D2D 1:M communication environment so as to facilitate the discovery of UEs, groups of UEs or services within a UE's range even when out of coverage of an eNB.

According to the present disclosure, the D2D communications may be advantageously used to send and receive discovery messages via the D2D communication protocol.

Figure 6:
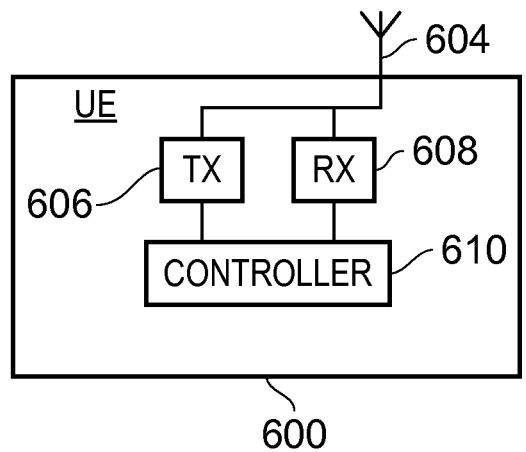
FIG. 6 provides a schematic illustration of a UE.

FIG. 6 illustrate a simplified structure of a UE for use in accordance with the teachings of the present disclosure. The UE 600 include an antenna 604 for sending and receiving wireless signals, a transmitter ("TX") 606 for sending signals via the antenna 604 and a receiver ("RX") 608 for receiving signals via the antenna. In other words, the UE 600 is configured to communication via a wireless interface. The controller 610 can control messages sent and received, for example by generating messages to be sent or by decoding received messages. The UE 600 illustrated in FIG. 6 is representative of a typical UE in an LTE environment. However other UEs may be suitable for use with the present invention. For example, the same or similar UEs can sometimes be represented with a transceiver in place of the TX and RX pair. Such UEs are also considered as suitable for use in accordance with the teachings of the present disclosure.

Figure 7:
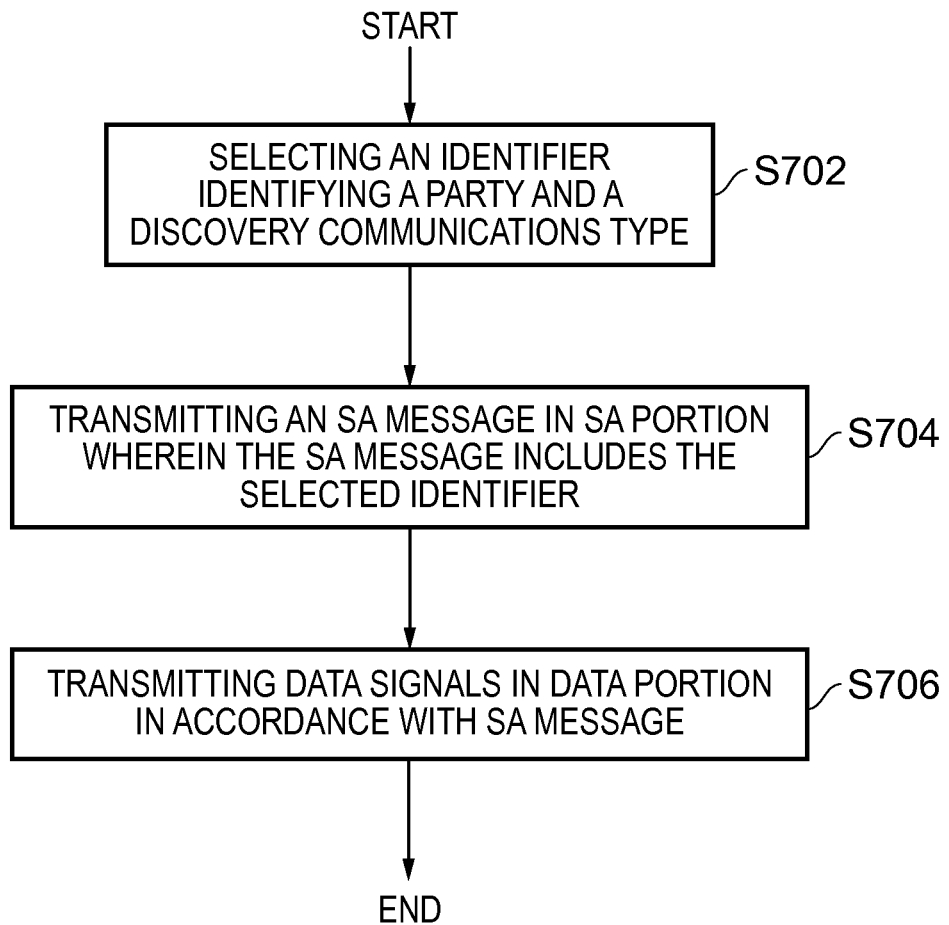
FIG. 7 provides a schematic flowchart of a method in accordance with the present disclosure.

FIG. 7 illustrates a method of communicating using a UE via a wireless access interface wherein signals representing data are transmitted in accordance with a D2D communication protocol via a shared communication channel of the wireless access interface. At step S702, an identifier identifying a party and a discovery communications type is selected. In some examples, step S702 may be triggered by the detection by the UE (e.g. by a controller 610) that discovery communications are to be sent. For example, upon detection by a controller 610 that discovery communications are to be sent via the wireless interface using D2D communications protocols, the controller 610 may initiate the method illustrated in FIG. 7, or another method in accordance with the present disclosure. The details of the identifier selection are further discussed below in respect of the announcing or discovering of a presence and in respect of the types of discovery communications.

At step S704, the UE may then transmit a scheduling assignment ("SA") message in an SA portion of the shared communications channel. The SA message comprises the selected identifier for discovery by one or more other communications devices. Finally, at step S706, the UE may transmit data signals, or signals representing data, in a data portion of the shared communications channel in accordance with the scheduling assignment message. In particular, the data may be sent using resources indicated in the SA message. An illustration of a possible use of SA and data portion for sending messages is briefly discussed below in respect of FIG. 9.

Figure 8:
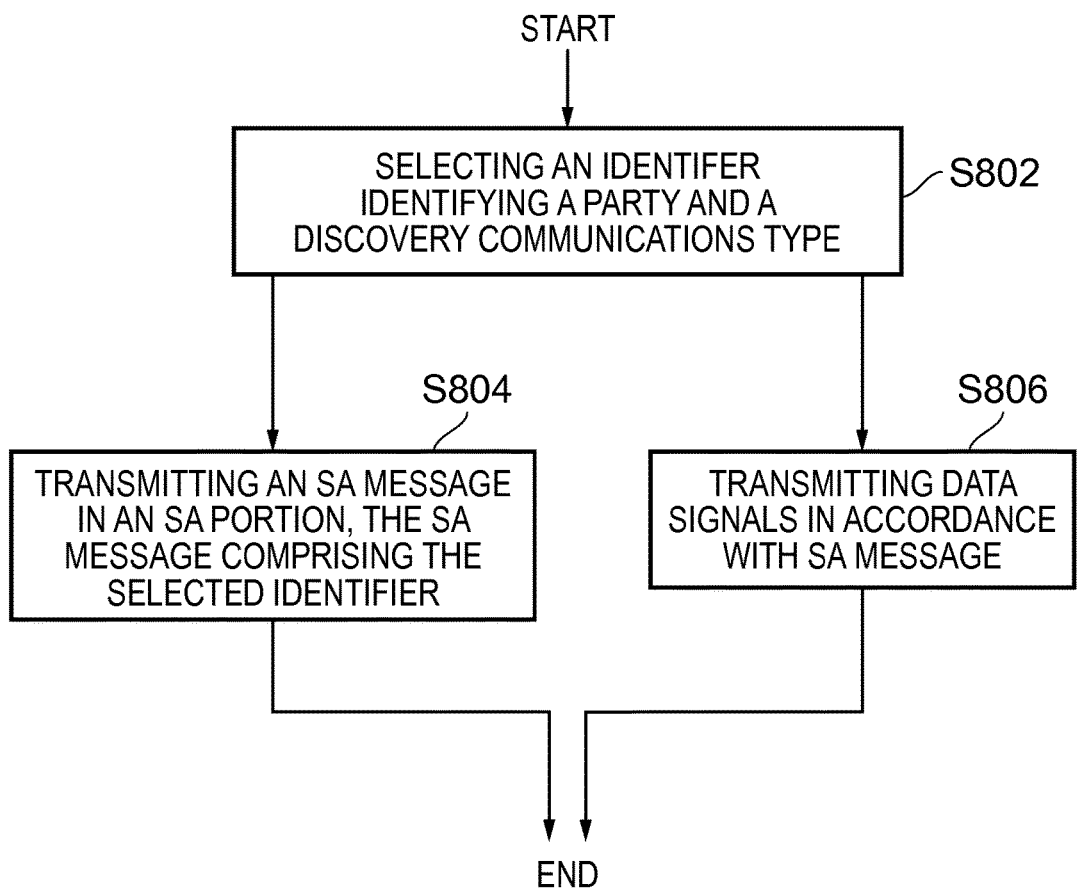
FIG. 8 provides a schematic flowchart of a further method in accordance with the present disclosure.

It is noteworthy that in the example of FIG. 7, steps S704 and S706 are carried out sequentially but they may also be carried substantially contemporaneously, as illustrated in FIG. 8. FIG. 8 corresponds substantially to FIG. 7 where steps S804 and S806 are carried out at substantially the same time. Depending on the SA mechanisms used for the D2D communications and/or on the amount of data to be transmitted, the steps S804 and S806 may start at the same time or step S804 may start before S806 and once step S806 has started, they may be continuously performed in parallel.

Figure 9:
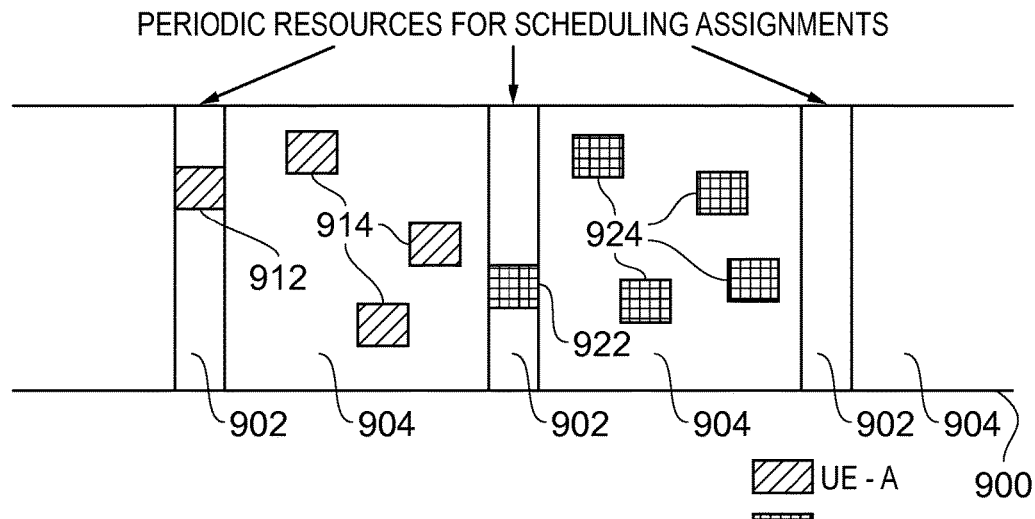
FIG. 9 provides a schematic diagram of possible scheduling assignment and data portions of a shared communication channel for device to device communications.

FIG. 9 illustrate a possible arrangement of SA portions and data portions for sending data via a shared channel 900 in a D2D environment. In this example, resources are reserved on a periodical basis, in SA portions or SA regions 902, for sending SA messages such as SA 912 and 922 for UE-A and UE-B, respectively. The resources for sending the data or payload can be found in data portions 904. Each SA provides an indication of the resources used in the data portions 904 for sending the data. For example, for UE-A, the SA 912 provides an indication that the corresponding data or payload can be found in resources 914 within the data portions 904 while the SA 922, for UE-B, provides an indication that the corresponding payload can be found in resources 924 in data portions 904. Therefore, the UE-A would scan the SA portion 902 for any SA 912 directed to UE-A and, if found, would then decode the data found in the allocated resources 914 identified in the SA 912. Likewise, the UE-B would scan the SA portion 902 for any SA 922 directed to UE-A and, if found, would then decode the data found in the allocated resources 924 identified in the SA 922.

As mentioned above, other arrangements may also provide SA portions/data portions arrangements suitable for use with D2D communications on a shared communications. For example, the SA portion may be provided by reserving a certain width of the total frequency width for sending SA message (e.g. by reserving a top band for SA messages) or by providing any possible combination of reserved time and frequency resources for sending SA messages and for sending payloads. Also, FIG. 9 provides a simplified illustration of arrangement discussed above as the shared channel may also comprise resources reserved for reference or synchronisation signals and/or for any other types of signals.

As discussed before, discovery communications in accordance with the present disclosure may advantageously be used in various ways, including to announce the presence of a party and to discover the presence of a party. The following sections illustrate how the teachings of the present disclosure may be used in a variety of cases.

Discovery—Announcing Presence

In this use case, a UE may wish to announce its presence and/or the presence of a group it is part of. For example, a UE associated with an ambulance driver may be part of one or more groups (e.g. "ambulance services" and "ambulance driver") and may attempt to announce its presence and/or the presence of any of the groups it is part of. For example, when a certain set of criteria is met, the UE may attempt to announce its presence as well as the presence of the group "ambulance services" and "ambulance driver". The set may include criteria such as the UE being powered on, the UE being out of coverage, the UE having communications to send or to receive, etc.

In this case, the D2D environment presents a challenge for discovery communications as the UE may not be addressing any specific UE or group in particular. In particular, messages sent to all are not well-adapted to one-to-one D2D communications environments.

In accordance with a first example of the present disclosure, the UE may use a generic discovery identifier. The generic discovery identifier may be used in the SA for sending discovery information to all UEs. In other words, this generic identifier identifies a party (all UEs) and a discovery communications type which can be used in a SA message. The discovery communications type may be no-specific (e.g. it may merely indicate a discovery message), or it may be more specific and also specify a type of discovery communications (e.g. open, restricted, etc.). Further details are provided below in that respect.

In this first example, D2D capable UEs could be modified to decode messages expressly directed to them (conventional D2D communications) and directed to the generic identifier (discovery messages) by scanning the SA messages in the SA portion for. Advantageously, discovery messages could be easily identified and differentiated from conventional data messages and can thus be selected for decoding. The data or payload corresponding to the SA message (and using the data portion resources indicated in the SA message) may comprise further discovery information, for example an identification of one or more UEs, groups of UEs or services whose presence is announced. Using the ambulance driver illustration, the SA message may comprise a generic discovery identifier while the corresponding data in the data portion may clarify that the message is for announcing the presence of this user, the presence of the "ambulance services" and "ambulance driver" groups and possibly the presence of one or more services (e.g. message forwarding to an eNodeB).

In accordance with a second example of the present disclosure, the UE may use its own identification as the first part of the identifier. For example, a UE-A may construct an identifier ID based on a combination of its own identification ("ID-A") and of a discovery identifier "ID-Disc", such as a concatenation of these two elements. A second UE, UE-B, receiving this message may then detect from the identifier ID that the message relates to discovery communications, for example from the detection of a discovery identification ID-Disc within the identifier ID. UE-B may then decode the message, despite the identifier in the SA message referring to the UE-A, not the UE-B. As a reminder, in conventional D2D communications environments, a UE decodes messages which include its own identification so as to retrieve the data it has been sent. It is therefore unconventional and counter-intuitive to use an arrangement where, in a D2D environment, a UE scans SA messages for identification other than its own, let alone for the identification of the source of the message. This arrangement may thus require more modifications of conventional D2D environments than other options, however it provides a flexible arrangement where any party may announced its presence to any other party without being limited to pre-set lists of acceptable sources or destinations for discovery messages. Any UE can detect discovery messages from any source by scanning SA messages for identifier identifying discovery communications.

Additionally and optionally, the UE-B may perform a step of checking that the source of the discovery message (UE-A) is recognised or allowable and may then make a decoding decision based on the identity of UE-A. If for example the UE-A is detected as being white-listed by the UE-B, UE-B may decode and process the discovery message. On the other hand, if UE-A is black-listed by UE-B, UE-B may simply ignore the discovery message.

In accordance with a third example of the present invention, the UE may use identification for a UE, a group or service to generate the identifier. As an illustration, in the ambulance example, an SA message for the UE may comprise an identifier based on an "ambulance driver" group identification. In this example, a further UE would make a decision whether to decode the discovery message based on the group identified. If for example the further UE wishes to contact a member of the ambulance driver group, it may decide to decode the discovery message. If however the further UE does not wish to receive discovery information in respect of this group, it may ignore the message.

In accordance with a third example, in cases where a UE wishes to announce its presence to a target UE or to a group, it may base the identifier on an identification for the target UE or group. For example, the identifier may be based on the target identification to which a "discovery" prefix or suffix has been added. Thus if the target UE or if a UE of the target group receives such a message, it can make a decision whether to decode the discovery message. In the meantime, the UE may operate in a conventional manner by decode all D2D messages sent to it in the absence of identification of the communications being of the discovery communications type.

Figure 10:
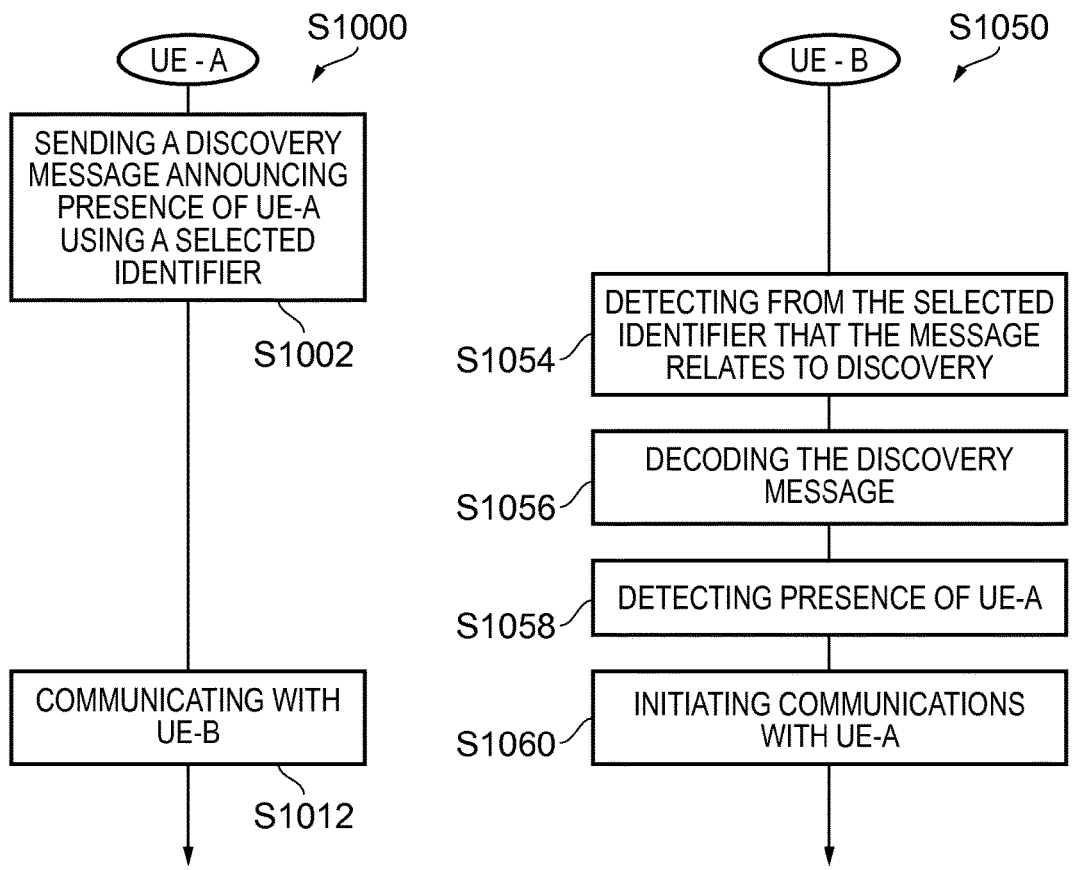
FIG. 10 provide a schematic time chart of an example of two UEs carrying out discovery.

FIG. 10 is an illustration of a possible timeline for two UEs (UE-A and UE-B) wherein UE-A initiates discovery communications to announce its presence. At step S1000, UE-A sends a discovery message to announce its presence by sending an SA message including an identifier and a data message corresponding to the SA message. UE-A uses the identifier to announce its presence, for example by selecting an identifier based on a combination of an identifier for UE-A and of an identifier for discovery communications. At step S1054 UE-B detects, upon reception of the message, that this message relates to discovery. For example it may detect that the identifier comprises identification for discovery communications. Following this detection, UE-B decodes discovery message at S1056 by decoding the corresponding data message. At step S1058, once UE-B has processed the discovery message, it has detected the presence of UE-A. At this stage, UE-A may still be unaware that UE-B has detected its presence. In some examples, the method may stop there and UE-B may for example be aware of UE-A's presence, in case communicating with UE-A may be needed. In the illustration of FIG. 10, UE-B proceeds with step S1060 where it initiates communications with UE-A. At this stage, UE-A is also aware of the presence of UE-B and it may start communicating with UE-B (S1012)

In view of the above examples and discussions, the present disclosure provides methods for sending discovery communications for announcing the presence of a party, wherein a party may refer to, for example, a UE, a group of UE and/or a service.

Discovery—Discovering Presence

In this case, discovery messages are for discovering which parties are available to a UE-A. This includes for example, identifying UEs within the range of UE-A, identifying groups available within the range of the UE-A or identifying the services available to the UE-A.

By definition, the UE-A may not be aware of which parties are available within its range and using conventional D2D messaging methods may be difficult. The UE could potentially send messages to each of the parties that it may wish to discover using existing D2D communications methods. This method could help discovering the presence status of these parties, however the discovery process may be lengthy, inefficient and resource-consuming (both from radio and computing points of view). In other words, D2D environments are not well-suited for discovering the presence of other parties. It may therefore be beneficial to use communications methods which are more suitable for discovery communications type messages.

In a first example, the UE may use a generic discovery identifier. For example, the UE may include, within the payload portion of one or more messages, details as to the party or parties it wishes to discover while the generic discovery identifier may help increasing the number of UEs decoding this payload portion in the one or more messages sent by the UE.

For example a UE-A may send a message using a generic discovery identifier (e.g. which can also be used for announcing presence or which can indicate that the message is for discovering presence) in an SA message. Once the data message, or payload message, corresponding to the SA message has been decoded, the content can be accessed so that the discovery process can be completed, if possible and if appropriate.

In accordance with a second example, and as for discovery messages for announcing the presence of a party, the UE sending the discovery message may use its own identification as the first part of the identifier. For example, a UE-A may construct an identifier "ID" based on a combination of its own identification ("ID-A") and of a discovery identifier "ID-Disc", such as a concatenation of these two elements. A second UE, UE-B, receiving this message may then detect from the identifier ID that the message relates to discovery communications, for example from the detection of a discovery identification ID-Disc within the identifier ID. UE-B may then decode the message, despite the identifier in the SA message referring to the UE-A, not the UE-B. Based on the content of the message, UE-B may continue the discovery process, if appropriate.

In accordance with a third example, and as for discovery messages for announcing the presence of a party, the UE sending the discovery message may use identification for a party (a UE, a group or service) to generate the identifier. In this example, devices which are either expressly identified as being the UE to be discovered, which are part of the group to be discovered or which are a provider of the service to be discovered will detect from the identifier that the UE is attempting to discover the presence of the UE.

Any UE which detects that it can participate in discovery of the presence of a party may then respond to the initial message to complete the discovery process.

In each of these three examples, the discovery communications can include one or more of the following information: (i) an indication that the message relate to an attempt to discover the presence as the type of discovery communications, (ii) the identity of UE sending the message, (iii) one or more parties that UE-A is attempting to discover and (iv) security credentials for performing discovery. Based on the information provided in the SA and/or payload portion, any relevant UE may respond to the discovery message from UE-A in order to confirm the presence of one or more parties to UE-A.

Discovery—Types of Discovery Communications

The above discussion illustrates that a D2D environment may be adapted or used to facilitate discovery communications, whether for announcing or for discovering a party's presence. For the sake of completeness, more detailed types of discovery messaging will be further described below.

The messaging may be for "open" discovery which includes situations where the discovery is open to any party. For example, an "emergency calls" service may be provided wherein a UE with eNodeB access can offer UEs without eNodeB connectivity to route their emergency calls to its eNodeB so that they can reach the mobile network. It may be advantageous to have such a service available to all and it may therefore allow an open type of discovery. In a case where a UE attempts to use this service (e.g. because the used is making an emergency call), the UE may send a discovery message for discovering whether this service is available (i.e. discovering the presence of the service) and any UE receiving this discovery message may reply to indicate that it can provide the service.

The discovery messaging may also be initiated by a UE providing access to the service. This UE may send, e.g. on a periodical basis, discovery message to announce the presence of the service wherein the discovery messages may be readable by all and/or may indicate that the discovery is an open discovery.

In another example, the messaging may be for a "restricted" discovery where the access to a party may be limited to specific UEs. This limited access may also include restrictions for discovering the presence of the party. The discovery process may therefore rely on security steps to authenticate a UE attempting to discover the party (either as the initiator of the discovery messaging or as a UE responding to a discovery message). Depending on the security level, the complexity of implementation and on the UEs capabilities, security credentials (for carrying out the security steps) may sent at least in part in the SA messages and/or in the data messages exchanged during discovery.

The discovery messages may include an indication of whether the discovery is open or restricted. For example, the identifier to be sent in an SA message may be selected to reflect the type of discovery. In other examples, the identifier merely identifies that the communications relate to discovery and any details as the open/restricted type may be provided in the data portion, if provided at all.

The teachings of the present disclosure may therefore be used in respect of open or restricted discovery, regardless of the discovery communications being initiated by a message announcing or attempting to discover the presence of a party.

Discovery—Possible Variations and Other Aspects

In some examples, the specific type of discovery communication may be indicated, if indicated at all, using the identifier and/or within the information sent in the data portion of the shared communication channel.

Also, depending in the type of discovery messages, it may be advisable to provide a certain degree of protection or privacy to the discovery message. In such cases, the CRC for the scheduling assignment (if provided) and/or the data part for the message may be scrambled, when appropriate, using at least part of the identifier so that only a limited number of UEs may decode the message. For example, the scrambling may be based on an identifier to be used for discovery messages in respect of a group of UEs. Provided that only the UEs in this group are aware of the identifier, only these UEs will be in a position to exchange discovery messages using this identifier.

Also, when selecting the identifier for the SA message, the identifier may be selected by combining an existing identifier for a party (e.g. which may be used in conventional D2D communications) with a discovery indicator indicating that the SA message relates to discovery messaging, i.e. identifies a "discovery communications" type. In some examples this may be done by reserving some values, or some bits in the identifier, to be used specifically for conveying that this is a discovery signal. In some examples set out in a LTE environment, a logical channel ID (LCID) field may be re-used as part of the identifier so as to minimise the impact on the existing D2D system when implementing D2D discovery communications. Additionally, the identifier may identify a type of discovery communication and/or a priority for the corresponding communications, e.g. "discovering presence", "announcing presence", "discovery" (generic type) or "discovery ack". The two-bits LCID may also be re-used to indicate the type and/or priority of the discovery communications which enables a re-use of existing resources in a different context for which they were not designed.

In the present disclosure, most examples have been provided in a context where two-way D2D communications are established—or are to be established—between at least two UEs. However, it is hereby intended that this disclosure expressly include cases of one-way communications. For example cases where a UE-A only will send messages, to a UE-B (e.g. a UE-A is sending report to a reporting UE), the UE-B may send discovery messages to announce its presence (e.g. the presence of a reporting UE) but it may never send any conventional content or data to UE-A.

In accordance with the teachings of the present disclosure, a UE may advantageously differentiate discovery from non-discovery messages based on L1 and/or L2 signals thereby simplifying messages processing. Discovery messages are conventionally messages of higher layers. The processing of discovery messages, including the identification and/or filtering of discovery messages, can therefore involve higher-layer logic which, in turn, requires more computing and battery resources. It can thus be beneficial for the UE to perform discovery identification and filtering using L1/L2 signals with a view to avoiding processing unnecessary information.

It is pointed out that, in the present disclosure, the term party may refer to one or more device or to a service. A service may for example be forwarding messages to an eNodeB (which may for example require access to the Home network), forwarding of emergency calls to an eNodeB (which may for example only require access to a Visiting network). The service may also be a conventional internet service, e.g. emails, web browsing, access to private network, etc. The discovery messages may be sent in respect of one or more parties. For example, when a generic discovery ID is used to select the identifier for the SA message, the data transmitted in the data portion may be in respect of discovery of more than one party.

Also the terms UE, device and communications device have been interchangeably.

Further aspects of the present disclosure are described in the following numbered clauses 1. A method of communicating using a communications device via a wireless access interface, the method comprising:

transmitting signals representing data in accordance with a device-to-device communication protocol via a shared communication channel of the wireless access interface, the transmitting the signals comprising:

selecting an identifier which identifies a party and identifies a discovery communication type;

transmitting a scheduling assignment message in an scheduling assignment portion of the shared communications channel, wherein the scheduling assignment message comprises the selected identifier for discovery by one or more other communications devices and transmitting the signals representing the data in a data portion of the shared communications channel in accordance with the scheduling assignment message.

2. The method of any preceding clause, wherein the wireless access interface is a mobile network interface wherein, optionally, the mobile network interface is a 3GPP/LTE device-to-device interface.

3. The method of any preceding clause wherein the scheduling assignment message includes an indication of the resources of the data portion of the shared communications channel used for transmitting the signals.

4. The method of any preceding clause, wherein the party is one of the communications device, a further communications device, a group of communications devices and a service.

5. The method of any preceding clause wherein the identifier is at least partly based on an identifier of the communications device, a further communications device or a group of communications devices.

6. The method of any of clauses 1 to 4, wherein the identifier is a generic discovery identifier.

7. The method of any preceding clause wherein the transmitted scheduling assignment message and represented data are for a discovery message for announcing the presence of the party.

8. The method of any of clauses 1 to 6 wherein the transmitted scheduling assignment message and represented data are for a discovery message for discovering the party.

9. The method of any preceding clauses wherein the discovery communications type identified is one of non-specified, restricted and open discovery communications.

10. The method of any preceding clause, wherein the scheduling assignment message comprises security information for performing restricted discovery communications.

11. The method of any preceding clauses wherein at least part of the identifier is used for scrambling at least one of a CRC of the scheduling assignment and the represented data sent in the data portion in accordance with the scheduling assignment.

12. The method of any preceding clauses, wherein the scheduling assignment is sent as a Layer 1 control signal.

13. The method of any of clauses 1 to 11, wherein the scheduling assignment is sent as a Layer 2 control signal.

14. A communications device comprising a transmitter; a receiver; and a controller, wherein the transmitter and receiver provide a wireless access interface and wherein the controller is arranged to transmit, via the transmitter, signals representing data in accordance with a device-to-device communication protocol via a shared communication channel of the wireless access interface, the controller being arranged to transmit the signals comprises the controller being arranged to:

select an identifier which identifies a party and identifies a discovery communication type;

transmit a scheduling assignment message in an scheduling assignment portion of the shared communications channel, wherein the scheduling assignment message comprises the selected identifier for discovery by one or more other communications devices and transmit the signals representing the data in a data portion of the shared communications channel in accordance with the scheduling assignment message.

15. The communications device of any of clause 14, wherein the wireless access interface is a mobile network interface wherein, optionally, the mobile network interface is a 3GPP/LTE mobile network interface.

16. The communications device of clause 14 or 15, wherein the scheduling assignment message includes an indication of the resources of the data portion of the shared communications channel used for transmitting the signals.

17. The communications device of any of clauses 14 to 16, wherein the party is one of the communications device, a further communications device, a group of communications devices and a service.

18. The communications device of any of clauses 14 to 17, wherein the identifier is at least partly based on an identifier of the communications device, a further communications device or a group of communications devices.

19. The communications device of any of clauses 14 to 17, wherein the identifier is a generic discovery identifier.

20. The communications device of any of clauses 14 to 19, wherein the transmitted scheduling assignment message and represented data are for a discovery message for announcing the presence of the party.

21. The communications device of any of clauses 14 to 19, wherein the transmitted scheduling assignment message and represented data are for a discovery message for discovering the party.

22. The communications device of any of clauses 14 to 21, wherein the discovery communications type identified is one of non-specified, restricted and open discovery communications.

23. The communications device of any of clauses 14 to 22, wherein the scheduling assignment message comprises security information for performing restricted discovery communications.

24. The communications device of any of clauses 14 to 23, wherein the identifier is used for scrambling the CRC of the scheduling assignment.

25. The communications device of any of clauses 14 to 24, wherein the scheduling assignment is sent as a Layer 1 control signal.

26. The communications device of any of clauses 14 to 24, wherein the scheduling assignment is sent as a Layer 2 control signal.

REFERENCES

[1] R2-133840, "CSMA/CA based resource selection," Samsung, published at 3GPP TSG-RAN WG2 #84, San Francisco, USA, 11-15 Nov. 2013.

[2] R2-133990, "Network control for Public Safety D2D Communications", Orange, Huawei, HiSilicon, Telecom Italia, published at 3GPP TSG-RAN WG2 #84, San Francisco, USA, 11-15 Nov. 2013.

[3] R2-134246, "The Synchronizing Central Node for Out of Coverage D2D Communication", General Dynamics Broadband UK, published at 3GPP TSG-RAN WG2 #84, San Francisco, USA, 11-15 Nov. 2013.

[4] R2-134426, "Medium Access for D2D communication", LG Electronics Inc, published at 3GPP TSG-RAN WG2 #84, San Francisco, USA, 11-15 Nov. 2013.

[5] R2-134238, "D2D Scheduling Procedure", Ericsson, published at 3GPP TSG-RAN WG2 #84, San Francisco, USA, 11-15 Nov. 2013.

[6] R2-134248, "Possible mechanisms for resource selection in connectionless D2D voice communication", General Dynamics Broadband UK, published at 3GPP TSG-RAN WG2 #84, San Francisco, USA, 11-15 Nov. 2013.

[7] R2-134431, "Simulation results for D2D voice services using connectionless approach", General Dynamics Broadband UK, published at 3GPP TSG-RAN WG2 #84, San Francisco, USA, 11-15 Nov. 2013.

[8] "D2D Resource Allocation under the Control of BS", Xiaogang R. et al, University of Electronic Science and Technology of China, https://mentor.ieee.org/802.16/den/13/16-13-0123-02-000n-d2d-resource-allocation-under-the-control-of-bs.docx

[9] US20130170387

[10] US20120300662

[11] LTE for UMTS: OFDMA and SC-FDMA Based Radio Access, Harris Holma and Antti Toskala, Wiley 2009, ISBN 978-0-470-99401-6.

The invention claimed is:

1. A method of communicating using a communications device via a wireless access interface, the method comprising:
transmitting signals representing data in accordance with a device-to-device communication protocol via a shared communication channel of the wireless access interface, the transmitting the signals comprising:
selecting an identifier which identifies a party and identifies a discovery communication type, wherein the party comprises a service;
transmitting a scheduling assignment message in an scheduling assignment portion of the shared communications channel, wherein the scheduling assignment message comprises the selected identifier for discovery by one or more other communications devices and
transmitting the signals representing the data in a data portion of the shared communications channel in accordance with the scheduling assignment message.

2. A method of claim 1, wherein the wireless access interface is a mobile network interface wherein the mobile network interface is a 3GPP Long Term Evolution (LTE) device-to-device interface.

3. A method of claim 1, wherein the scheduling assignment message includes an indication of resources of the data portion of the shared communications channel used for transmitting the signals.

4. A method of claim 1, wherein the party further comprises one of the communications device, a further communications device, and a group of communications devices.

5. A method of claim 1, wherein the identifier is at least based on an identifier of the communications device, a further communications device or a group of communications devices.

6. A method of claim 1, wherein the identifier is a generic discovery identifier.

7. A method of claim 1, wherein the transmitted scheduling assignment message and represented data are for a discovery message for announcing the presence of the party.

8. A method of claim 1, wherein the transmitted scheduling assignment message and represented data are for a discovery message for discovering the party.

9. A method of claim 1, wherein the discovery communications type identified is one of non-specified, restricted and open discovery communications.

10. A method of claim 1, wherein the scheduling assignment message comprises security information for performing restricted discovery communications.

11. A method of claim 1, wherein at least part of the identifier is used for scrambling at least one of a cyclic redundancy check (CRC) of the scheduling assignment and the represented data sent in the data portion in accordance with the scheduling assignment.

12. A method of claim 1, wherein the scheduling assignment is sent as a Layer 1 control signal.

13. A method of claim 1, wherein the scheduling assignment is sent as a Layer 2 control signal.

14. A communications device comprising a transmitter; a receiver; and a controller,
wherein the transmitter and receiver provide a wireless access interface and
wherein the controller is arranged to
transmit, via the transmitter, signals representing data in accordance with a device-to-device communication protocol via a shared communication channel of the wireless access interface, the controller being arranged to transmit the signals comprises the controller being arranged to:

select an identifier which identifies a party and identifies a discovery communication type, wherein the party comprises a service;

transmit a scheduling assignment message in an scheduling assignment portion of the shared communications channel, wherein the scheduling assignment message comprises the selected identifier for discovery by one or more other communications devices and transmit the signals representing the data in a data portion of the shared communications channel in accordance with the scheduling assignment message.

15. A circuitry for communicating using a communications device via a wireless access interface, wherein the circuitry comprises a transmitter; a receiver; and a controller, the transmitter and receiver providing a wireless access interface and wherein the transmitter; receiver; and controller are configured to operate together to, transmit, via the transmitter, signals representing data in accordance with a device-to-device communication protocol via a shared communication channel of the wireless access interface, the controller being arranged to transmit the signals comprises the controller being arranged to:

select an identifier which identifies a party and identifies a discovery communication type, wherein the party comprises a service;

transmit a scheduling assignment message in an scheduling assignment portion of the shared communications channel, wherein the scheduling assignment message comprises the selected identifier for discovery by one or more other communications devices and transmit the signals representing the data in a data portion of the shared communications channel in accordance with the scheduling assignment message.

\* \* \* \* \*